US012529987B2

(12) United States Patent
Morimoto et al.

(10) Patent No.: US 12,529,987 B2
(45) Date of Patent: Jan. 20, 2026

(54) SHEET DETECTION DEVICE AND IMAGE FORMING APPARATUS

(71) Applicant: CANON KABUSHIKI KAISHA, Tokyo (JP)

(72) Inventors: Kazusa Morimoto, Chiba (JP); Takahiro Oonuma, Chiba (JP); Hiroki Sato, Ibaraki (JP); Norio Negishi, Tokyo (JP); Katsuhide Koga, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/830,840

(22) Filed: Sep. 11, 2024

(65) Prior Publication Data

US 2025/0093804 A1 Mar. 20, 2025

(30) Foreign Application Priority Data

Sep. 14, 2023 (JP) ................................ 2023-149047

(51) Int. Cl.
*G03G 15/00* (2006.01)
*B65H 5/36* (2006.01)

(52) U.S. Cl.
CPC ........... *G03G 15/5029* (2013.01); *B65H 5/36* (2013.01); *G03G 15/6529* (2013.01); *G03G 15/6558* (2013.01); *G03G 2215/00637* (2013.01)

(58) Field of Classification Search
CPC ........... G03G 15/5029; G03G 15/6529; G03G 15/6558; G03G 15/6567;
(Continued)

(56) References Cited

U.S. PATENT DOCUMENTS 10,894,689 B2 1/2021 Tai
2003/0194252 A1* 10/2003 Nakamori .......... G03G 15/5029 399/389
(Continued)

FOREIGN PATENT DOCUMENTS

JP 2009198682 A 9/2009
JP 2018200478 A 12/2018
JP 2021056299 A 4/2021

OTHER PUBLICATIONS

The Extended European search report issued in European Appln. No. 24199658.6 mailed on May 19, 2025.
(Continued)

*Primary Examiner* — Carla J Therrien
(74) *Attorney, Agent, or Firm* — ROSSI, KIMMS & McDOWELL LLP

(57) ABSTRACT

A sheet detection device includes a measurement unit for measuring a feature amount of a sheet conveyed by a conveyance unit, a pressing member movable between a first position separated from the measurement unit and a second position closer to the measurement unit than the first position, and a moving unit configured to move the pressing member, wherein the pressing member is arranged by the moving unit at the first position in a case where the sheet has not been conveyed by the conveyance unit to a measurement position of the measurement unit, wherein the moving unit is configured to move the pressing member to the second position from the first position in a case where the sheet has been conveyed by the conveyance unit to the measurement position of the measurement unit.

19 Claims, 11 Drawing Sheets

(58) Field of Classification Search

CPC ...... G03G 15/6588–6594; G03G 2215/00561; G03G 2215/00565; G03G 2215/00611; G03G 2215/00616; G03G 2215/0062; G03G 2215/00637; G03G 2215/00675; G03G 2215/00679; G03G 2215/00683; G03G 2215/00717; G03G 2215/00738; G03G 2215/00742; G03G 2215/00751; G03G 2215/00763; G03G 2215/00767; G03G 2215/00784; B65H 5/36; B65H 2404/153; B65H 2404/1544; B65H 2553/83

See application file for complete search history.

(56) References Cited

U.S. PATENT DOCUMENTS

2004/0094458 A1* 5/2004 Akaike .................. G01N 33/34 209/599
2006/0022400 A1* 2/2006 Kawasaki .............. B41J 11/009 271/227
2014/0161475 A1* 6/2014 Matsui ............... G03G 15/5029 399/45
2020/0255239 A1 8/2020 Izumiya et al.
2020/0356037 A1* 11/2020 Yoshimura ......... G03G 15/5029
2022/0176715 A1* 6/2022 Yoshimura ............. B41J 11/009
2022/0179347 A1* 6/2022 Maruyama ......... G03G 15/6573
2022/0179348 A1 6/2022 Maruyama
2023/0280147 A1 9/2023 Morimoto
2024/0126199 A1* 4/2024 Sato ................... G03G 15/5004
2025/0093803 A1* 3/2025 Oonuma ............ G03G 15/6529

OTHER PUBLICATIONS

European Search Report issued in European Appln. No. 24199658.6 mailed on Feb. 27, 2025.

* cited by examiner

SHEET DETECTION DEVICE AND IMAGE FORMING APPARATUS

BACKGROUND OF THE INVENTION

Field of the Invention

The present disclosure relates to a sheet detection device which includes a media sensor for discriminating a type of a sheet, and an image forming apparatus including such a sheet detection device.

Description of the Related Art

In recent years, image forming apparatus include a media sensor for discriminating a type of a sheet, which is a recording medium. The media sensor measures feature amounts of the sheet by using, for example, an optical sensor or an ultrasonic wave sensor. The image forming apparatus extracts, based on measurement results of the feature amounts of the sheet obtained by the media sensor, relevant sheet information from sheet information registered in advance and discriminates the type of the sheet. The sheet information is information including the feature amounts (for example, basis weight and surface properties) for each type of sheet.

The media sensor measures the feature amounts from the sheet which is being conveyed. In this case, the distance between the media sensor and the sheet may vary due to positional fluctuation (flapping) of the sheet at the measurement position of the media sensor. The flapping of the sheet may reduce the detection accuracy of the feature amounts by the media sensor. Particularly in a case where the media sensor is an optical sensor, the sheet may shift from the focus of the optical sensor, reducing the accuracy of the measurement results. This may lead to a reduction in the discrimination accuracy of the sheet type.

Meanwhile, in Japanese Patent Application Laid-open No. 2018-200478, there is disclosed a configuration in which a roller serving as a pressing member is arranged at a position facing the media sensor across a conveyance path of the sheet. In such a configuration, flapping of the sheet is suppressed by the roller pressing the sheet onto a surface of the media sensor. In U.S. Pat. No. 10,894,689, there is disclosed a configuration in which a roller is arranged so as not to contact members facing the roller in a direction orthogonal to the surface of the sheet.

However, although the pressing member which presses the sheet onto the media sensor suppresses the reduction in sheet detection accuracy, the pressing of the sheet may cause a sheet conveyance failure such as a paper jam. The present disclosure has been made in view of the problems described above, and a main object of the present disclosure is to provide a sheet detection device which can suppress a reduction in sheet detection accuracy and also suppress occurrence of a sheet conveyance failure.

SUMMARY OF THE INVENTION

A sheet detection device according to one embodiment of the present disclosure includes a measurement unit for measuring a feature amount of a sheet conveyed by a conveyance unit, a pressing member movable between a first position separated from the measurement unit and a second position closer to the measurement unit than the first position, and a moving unit configured to move the pressing member, wherein the pressing member is arranged by the moving unit at the first position in a case where the sheet has not been conveyed by the conveyance unit to a measurement position of the measurement unit, wherein the moving unit is configured to move the pressing member to the second position from the first position in a case where the sheet has been conveyed by the conveyance unit to the measurement position of the measurement unit, and wherein the measurement unit is configured to measure the feature amount of the sheet under a state in which the pressing member is arranged at the second position.

An image forming apparatus according to another embodiment of the present disclosure includes a sheet detection device including a measurement unit for measuring a feature amount of a sheet conveyed by a conveyance unit, a pressing member movable between a first position separated from the measurement unit and a second position closer to the measurement unit than the first position, and a moving unit configured to move the pressing member, wherein the pressing member is arranged by the moving unit at the first position in a case where the sheet has not been conveyed by the conveyance unit to a measurement position of the measurement unit, wherein the moving unit is configured to move the pressing member to the second position from the first position in a case where the sheet has been conveyed by the conveyance unit to the measurement position of the measurement unit, and wherein the measurement unit is configured to measure the feature amount of the sheet under a state in which the pressing member is arranged at the second position, and an image forming unit configured to form an image by using an image forming condition based on a feature amount of a sheet measured by the measurement unit.

A sheet detection device according to yet another embodiment of the present disclosure includes a measurement unit for measuring a feature amount of a sheet conveyed by a conveyance unit, a pressing member movable between a first position separated from the measurement unit and a second position closer to the measurement unit than the first position, and a moving unit configured to move the pressing member, wherein the moving unit is configured to move the pressing member from the first position to the second position in a case where an initial adjustment of the measurement unit is executed under a state in which a sheet has not been conveyed to a measurement position of the measurement unit, wherein the measurement unit is configured to execute the initial adjustment under a state in which the pressing member is arranged at the second position, and wherein the moving unit is configured to move the pressing member from the second position to the first position after the initial adjustment is executed.

An image forming apparatus according to yet another embodiment of the present disclosure includes a sheet detection device including a measurement unit for measuring a feature amount of a sheet conveyed by a conveyance unit, a pressing member movable between a first position separated from the measurement unit and a second position closer to the measurement unit than the first position, and a moving unit configured to move the pressing member, wherein the moving unit is configured to move the pressing member from the first position to the second position in a case where an initial adjustment of the measurement unit is executed under a state in which a sheet has not been conveyed to a measurement position of the measurement unit, wherein the measurement unit is configured to execute the initial adjustment under a state in which the pressing member is arranged at the second position, and wherein the moving unit is configured to move the pressing member from the second position to the first position after the initial adjustment is executed, and an image forming unit configured to form an image by using an image forming condition based on a feature amount of a sheet measured by the measurement unit.

Further features of the present invention will become apparent from the following description of exemplary embodiments (with reference to the attached drawings).

DESCRIPTION OF THE EMBODIMENTS

Now, referring to the accompanying drawings, description is given of at least one exemplary embodiment of the present disclosure. In the following description, "basis weight" is the mass per unit area of a sheet, and is expressed in units of g/m^2.

<Image Forming Apparatus>

Figure 1:
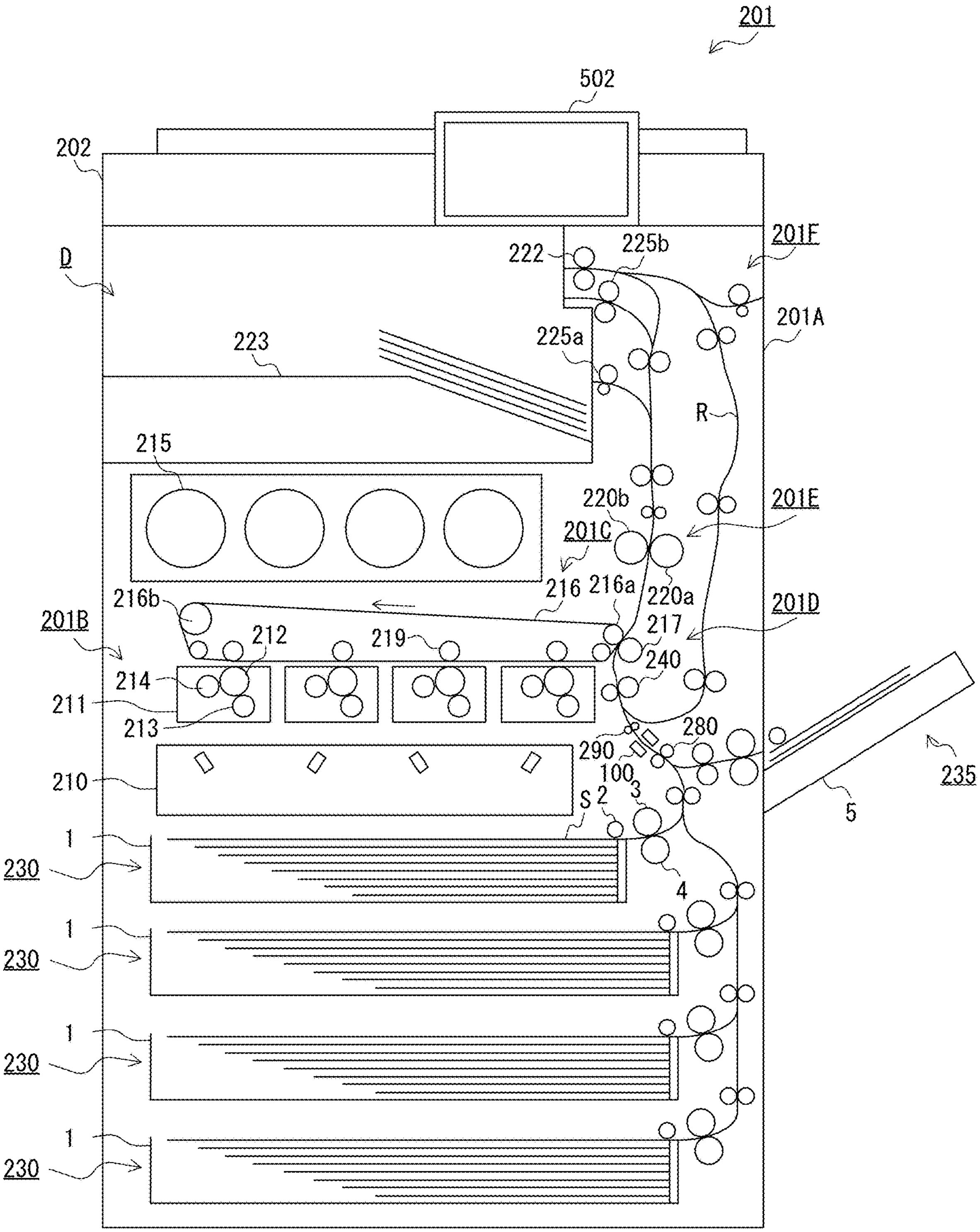
FIG. 1 is a configuration view of an image forming apparatus.

FIG. 1 is a configuration view of an image forming apparatus according to the at least one embodiment. An image forming apparatus 201 according to the at least one embodiment is, for example, a laser beam printer of a tandem intermediate-transfer type using an electrophotographic process. The image forming apparatus 201 forms a full-color image or a monochrome image on a sheet S being a recording medium and outputs the sheet S based on image data acquired from an external device such as a personal computer via a network or based on image data acquired from an image reading device 202 which is provided on the top of the image forming apparatus 201.

The image forming apparatus 201 has, inside a main body 201A, components for forming an image, and includes, on the top of the main body 201A, the image reading device 202 and an operation unit 502. A delivery space D including a placement portion 223 for receiving the sheet S to be delivered thereinto after image formation is defined between the main body 201A of the image forming apparatus 201 and the image reading device 202.

The image reading device 202 is a reader which reads an image from an original to generate image data. The image reading device 202 is used, for example, at the time of processing of copying an original. The image reading device 202 in the at least one embodiment is configured as a part of the image forming apparatus 201. However, the image reading device 202 is not limited to this configuration, and the image reading device 202 may be electrically connected to the image forming apparatus 201 as a device different from the image forming apparatus 201.

The operation unit 502 is a user interface including an input interface and an output interface. Examples of the input interface include various key buttons and a touch panel. Examples of the output interface include a display and a speaker. A user can input various instructions to the image forming apparatus 201 via the operation unit 502. The image forming apparatus 201 notifies the user of various types of information by displaying various screens on the display of the operation unit 502. The operation unit 502 in the at least one embodiment is configured as a part of the image forming apparatus 201. The operation unit 502 is not limited to this configuration, and the operation unit 502 may be electrically connected to the image forming apparatus 201 as a device different from the image forming apparatus 201.

The image forming apparatus 201 includes, in the main body 201A, an image forming unit 201B, an intermediate transfer unit 201C, a secondary transfer unit 201D, a fixing device 201E, and cassette sheet-feeding units 230. The main body 201A includes a manual sheet-feeding unit 235.

The cassette sheet-feeding units 230 each feed sheets S from a corresponding one of sheet-feeding cassettes 1 accommodating the sheets S. The cassette sheet-feeding unit 230 includes a pickup roller 2 and a separation unit. The separation unit includes a feed roller 3 and a retard roller 4 for separating sheets S sent out from the pickup roller 2. The sheets S are fed one by one from the sheet-feeding cassette 1 by the pickup roller 2 and the separation unit. In the at least one embodiment, description is given of a configuration in which a plurality of (in this example, four) cassette sheet-feeding units 230 are provided. However, any number of cassette sheet-feeding units 230 may be provided. The sheet S fed from the cassette sheet-feeding unit 230 is conveyed to a registration roller pair 240 via conveyance roller pairs 280 and 290.

The sheet S can be fed from a unit other than the cassette sheet-feeding unit 230, that is, from the manual sheet-feeding unit 235. The manual sheet-feeding unit 235 includes a manual feeding tray 5 for receiving sheets S placed by the user. Similar to the cassette sheet-feeding unit 230, the manual sheet-feeding unit 235 includes a pickup roller and a separation unit, and sheets S are fed one by one from the manual feeding tray 5. The sheet S fed from the manual sheet-feeding unit 235 is also conveyed to the registration roller pair 240 via the conveyance roller pairs 280 and 290.

A media sensor 100 for measuring feature amounts of the sheet S is arranged on a conveyance path between the conveyance roller pair 280 and the conveyance roller pair 290. The media sensor 100 outputs, for example, information corresponding to a basis weight and information corresponding to surface properties as feature amounts of the sheet S conveyed from the cassette sheet-feeding unit 230 or the manual sheet-feeding unit 235. The media sensor 100 may be arranged at both or at least one of a position at which the sheet S fed from the cassette sheet-feeding unit 230 can be detected and a position at which the sheet S fed from the manual sheet-feeding unit 235 can be detected. Details of the configuration of the media sensor 100 are described later.

The image forming unit 201B is of a four-drum full-color type, and includes a laser scanner 210 and four process cartridges 211. The four process cartridges 211 form toner images of four colors, specifically, yellow (Y), magenta (M), cyan (C), and black (K). Each process cartridge 211 includes a photosensitive drum 212, a charging device 213, and a developing device 214. Toner cartridges 215 are arranged above the process cartridges 211. The toner cartridges 215 replenish the respective developing devices 214 with toner.

The intermediate transfer unit 201C includes an intermediate transfer belt 216 wound around a drive roller 216*a* and a tension roller 216*b*. On an inner side of the intermediate transfer belt 216, there are provided four primary transfer rollers 219 which are in abutment against the intermediate transfer belt 216 at positions opposing the photosensitive drums 212. The intermediate transfer belt 216 is rotated in the arrow direction by the drive roller 216*a* driven by a drive unit (not shown).

The secondary transfer unit 201D includes a secondary transfer roller 217 provided so as to sandwich the intermediate transfer belt 216 at a position opposing the drive roller 216*a*. The fixing device 201E is provided on a downstream side of the secondary transfer roller 217 in the conveyance direction of the sheet S, and includes a pressure roller 220*a* and a heating roller 220*b*. On a downstream side of the fixing device 201E in the conveyance direction of the sheet S, there are arranged a first delivery roller pair 225*a*, a second delivery roller pair 225*b*, and a duplex-printing reversing unit 201F. The duplex-printing reversing unit 201F includes a reversing roller pair 222 and a re-conveyance passage R. The reversing roller pair 222 is rotatable in forward and reverse directions. The re-conveyance passage R allows the sheet S having an image formed on one side thereof to be conveyed to the image forming unit 201B.

The image forming apparatus 201 having the configuration as described above operates as follows. The image forming apparatus 201 acquires, together with an instruction to start a print job, image data from the image reading device 202 or from an external device and forms an image corresponding to the image data on the sheet S. At this time, the image forming apparatus 201 performs each step of the image formation based on operating conditions given in accordance with features of the sheet S.

A print job is a series of operations performed based a print signal instructing an image to be formed on the sheet S, in which the sheet S is conveyed and an image is formed thereon, and after the image forming operation is complete, the sheet S is delivered to the placement portion 223. The image forming apparatus 201 acquires the instruction to start the print job from the operation unit 502 or an external device.

The image forming unit 201B uses the charging device 213 to uniformly charge surfaces of the photosensitive drums 212 to an electric potential having a predetermined polarity. The laser scanner 210 irradiates the uniformly charged surfaces of the photosensitive drums 212 with corresponding laser beams modulated based on the image data. In this way, electrostatic latent images for corresponding colors (yellow, magenta, cyan, and black) are formed on the respective surfaces of the photosensitive drums 212.

The image forming unit 201B uses the developing devices 214 to develop the electrostatic latent images formed on the photosensitive drums 212. The electrostatic latent images are developed on the photosensitive drums 212 with toners of corresponding colors so that toner images of the corresponding colors are formed on the photosensitive drums 212. The toner images are sequentially transferred from the photosensitive drums 212 to the rotating intermediate transfer belt 216 in superimposition by the primary transfer rollers 219. In this way, a full-color toner image is formed on the intermediate transfer belt 216. The intermediate transfer belt 216 rotates to convey the toner image to the secondary transfer unit 201D.

Concurrently with such operation of forming a toner image, the sheets S are conveyed one by one by the cassette sheet-feeding unit 230 or the manual sheet-feeding unit 235 to the registration roller pair 240. The feature amounts of the sheet S are measured by the media sensor 100 before the sheet S reaches the registration roller pair 240. The image forming apparatus 201 sets image forming conditions based on the measured feature amounts, and performs subsequent image formation based on the set image forming conditions. The image forming conditions to be set include, for example, a voltage value of secondary transfer bias applied to the secondary transfer roller 217 during transfer of the toner image to the sheet S, a fixing temperature at the time of fixing the image by the fixing device 201E, and a conveyance speed of the sheet S at the time of fixing.

The registration roller pair 240 corrects skew of the sheet S conveyed to the registration roller pair 240. After the skew is corrected, the sheet S is conveyed by the registration roller pair 240 to the secondary transfer unit 201D in synchronization with the timing at which the toner image borne on the intermediate transfer belt 216 is conveyed to the secondary transfer unit 201D. The secondary transfer unit 201D transfers the full-color toner image from the intermediate transfer belt 216 onto the sheet S with secondary transfer bias applied to the secondary transfer roller 217.

The sheet S having the toner image transferred thereto is conveyed to the fixing device 201E. The fixing device 201E sandwiches and conveys the sheet S with a roller nip portion defined by the pressure roller 220*a* and the heating roller 220*b*. The fixing device 201E heats the sheet S with the heating roller 220*b* at the time of sandwiching and conveying the sheet S, to thereby melt and mix the toners of respective colors on the sheet S. Further, the fixing device 201E presses the sheet S with the pressure roller 220*a*, to thereby fix the melted and mixed toners to the sheet S. At this time, the viscosity of the melted toner generates a sticking force to the heating roller 220*b* on the sheet S.

Figure 2A:
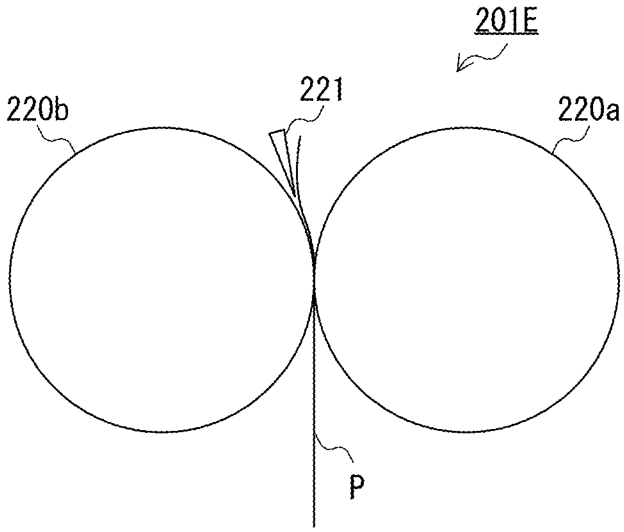
FIG. 2A and FIG. 2B are enlarged views of a fixing device.
Figure 2B:
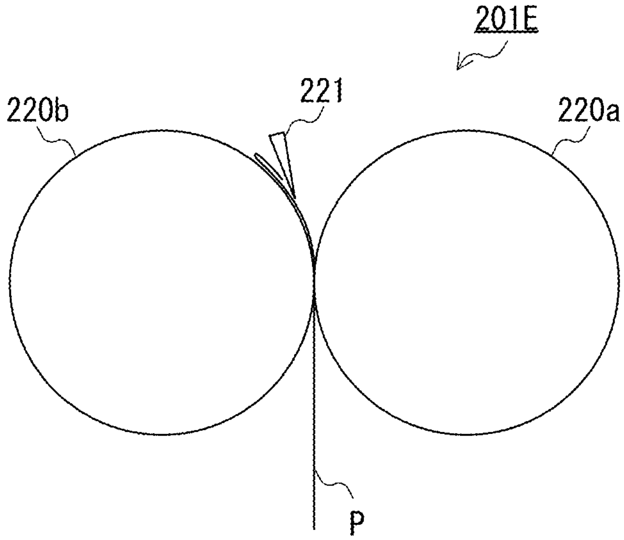

FIG. 2A and FIG. 2B are enlarged views of the fixing device 201E. In a case where the stiffness (strength) of the sheet S is small, the sticking force to the heating roller 220*b* generated on the sheet S may cause the sheet S to be rolled up by the heating roller 220*b* being rotated (FIG. 2B). Thus, a separation plate 221 which separates the sheet S is provided on a downstream side of the heating roller 220*b* in the conveyance direction of the sheet S (FIG. 2A).

The image forming apparatus 201 may determine the state of the separation plate 221 in accordance with the type and basis weight of the sheet S discriminated from the measurement results of the media sensor 100. For example, in a case where the sheet S of a type having a small stiffness is subjected to image formation, the separation plate 221 is arranged such that a distal end of the separation plate 221 is in contact with a surface of the heating roller 220*b* as illustrated in FIG. 2A, to thereby separate the sheet S from the heating roller 220*b*. In a case where the sheet S of a type having a large stiffness is subjected to image formation, the sheet S is not rolled up by the heating roller 220*b*. Thus, the separation plate 221 is arranged such that the distal end of the separation plate 221 is not in contact with the surface of the heating roller 220*b*. In this way, the surface of the heating roller 220*b* can be prevented from being worn by the separation plate 221.

The sheet S having the image fixed thereto is delivered to the delivery space D by any one of the first delivery roller pair 225*a* and the second delivery roller pair 225*b*. The sheet S is placed on the placement portion 223 provided in a protruding manner on a bottom surface of the delivery space D. In a case where images are formed on both sides of the sheet S, the sheet S having an image fixed on one side thereof is conveyed by the reversing roller pair 222 to the re-conveyance passage R. The sheet S is conveyed again to the image forming unit 201B, and an image is formed on another side of the reversed sheet S. The re-conveyance passage R allows the sheet S to be conveyed to the conveyance path between the conveyance roller pair 290 and the registration roller pair 240.

<Control Unit>

Figure 3:
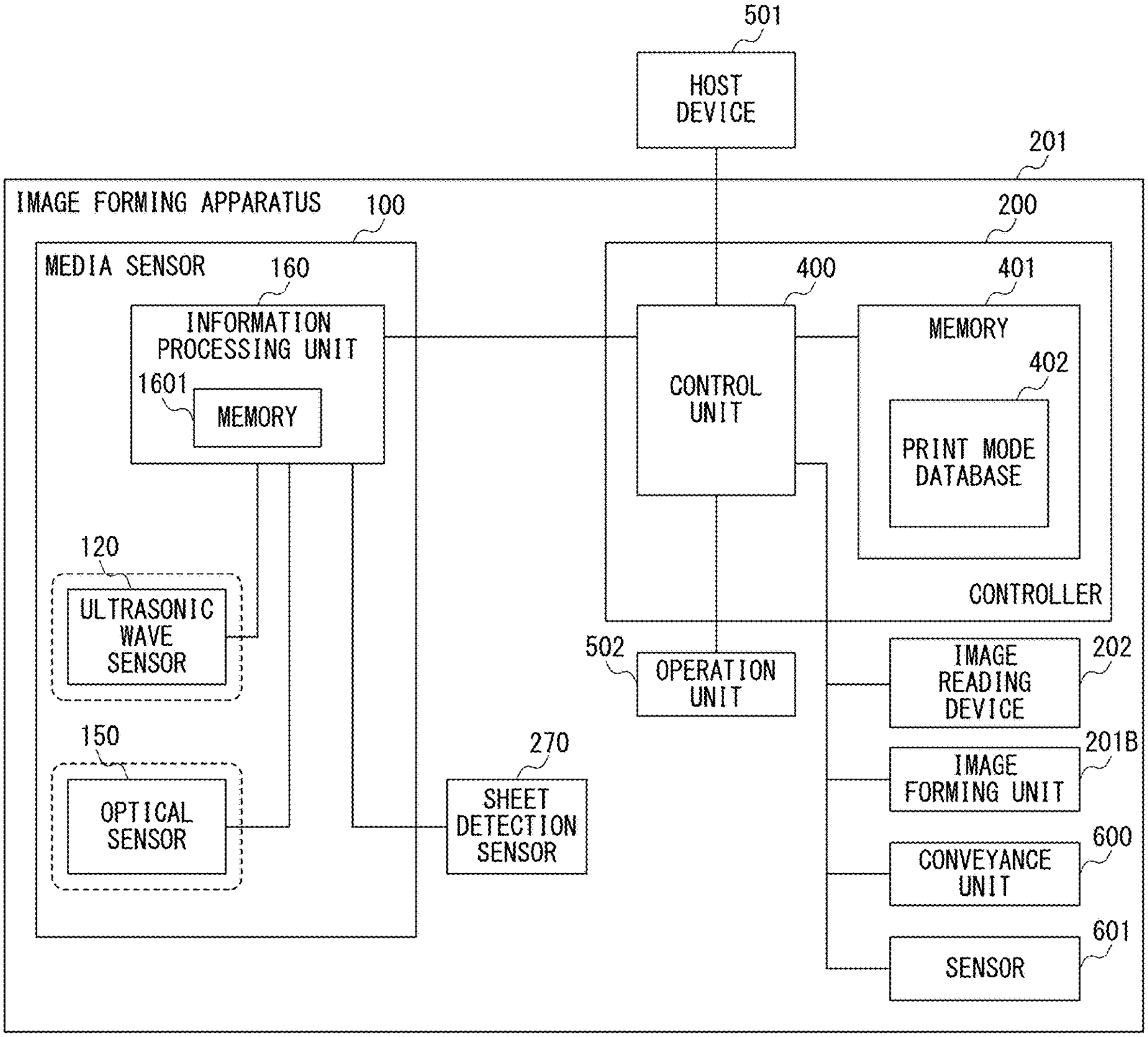
FIG. 3 is an explanatory diagram of a controller.

FIG. 3 is an explanatory diagram of a controller which controls operation of such image forming apparatus 201. A controller 200 is, for example, an information processing device including a central processing unit (CPU). The controller 200 may be achieved by, for example, a microprocessor unit (MPU) or an application specific integrated circuit (ASIC). The controller 200 controls the above-mentioned image forming operation performed by the image forming apparatus 201.

The controller 200 includes a control unit 400 and a memory 401. The memory 401 stores, for example, a control program for the image forming operation, initial values of various setting values, and various types of data required for the image forming operation. Further, the memory 401 has a storage area for storing a print mode database 402. The print mode database 402 is a database in which correspondences among features of the sheet and image forming conditions (print modes) are set in advance. Examples of the features of the sheet include the type and the basis weight of the sheet. The control unit 400 is connected to the operation unit 502, the image reading device 202, the image forming unit 201B, a conveyance unit 600, a sensor 601, and the media sensor 100. The control unit 400 can communicate to and from a host device 501, which is an external device.

The host device 501 is, for example, a personal computer, an image scanner, or a facsimile machine. The operation unit 502 inputs, for example, instructions and settings received via the input interface to the control unit 400. The operation unit 502 outputs various types of information via the output interface under the control of the control unit 400. As described above, the operation unit 502 includes the display as the output interface, and displays various types of information on the display.

The conveyance unit 600 includes the conveyance roller pairs 280 and 290, the pickup roller 2, the feed roller 3, the retard roller 4, and a motor which drives those rollers. The conveyance unit 600 also includes the registration roller pair 240, the secondary transfer roller 217, the pressure roller 220*a*, the heating roller 220*b*, and a motor which drives those rollers. Further, the conveyance unit 600 includes the first delivery roller pair 225*a*, the second delivery roller pair 225*b*, the reversing roller pair 222, other rollers which convey the sheet S in the image forming apparatus 201, and a motor that drives those rollers. The conveyance unit 600 controls feeding of the sheet S by driving and controlling each motor under the control of the control unit 400.

The control unit 400 acquires an instruction to start a print job from the host device 501 or the operation unit 502, and starts the print job. The control unit 400 acquires image data from the host device 501 or the image reading device 202, and performs image processing on the acquired image data. The control unit 400 executes the print job by causing the image forming unit 201B to form a toner image based on the image data that has been subjected to image processing, and causing the conveyance unit 600 to feed the sheet S.

The media sensor 100 includes an information processing unit 160, an ultrasonic wave sensor 120, and an optical sensor 150. In the at least one embodiment, the ultrasonic wave sensor 120 and the optical sensor 150 are used as a sheet measurement unit. In addition to the ultrasonic wave sensor 120 and the optical sensor 150, a sheet detection sensor 270 is connected to the information processing unit 160. The information processing unit 160 includes a memory 1601 therein. The information processing unit 160 is an information processing device achieved by, for example, a CPU, an MPU, or an ASIC.

The image forming conditions (for example, conveyance speed at the time of fixing, target fixing temperature, and transfer voltage at the time of secondary transfer) differ depending on the physical properties (for example, basis weight, stiffness, surface properties, and the material) of the sheet S on which the image is to be formed. Thus, it is required to set in advance the image forming conditions in accordance with the feature amounts of the sheet S to be used at the time of image formation.

Depending on the type of the sheet S, there may be some limitations in setting the sheet S to a feeding port (sheet-feeding cassette 1 or manual feeding tray 5). For example, some thick paper sheets having a high stiffness can be fed only from the manual feeding tray 5 with a conveyance path having a small curvature. Coated paper sheets having a smooth surface texture and a strong adhesion between sheets are required to be fed one by one from the manual feeding tray 5 in order to prevent a plurality of sheets from being conveyed on top of each other. Paper sheets made of pulp as a raw material generally have different bending stiffnesses in length and width directions because of bias in orientation directions of pulp fibers (fiber orientation) that occurs due to a manufacturing method. Thus, there is given a recommended orientation of the sheet in length and width directions at the time of setting the sheet to the feeding port so that the bending stiffness against the bending in the conveyance path becomes smaller. Further, for one-side coated paper sheets obtained by coating only one side of a plain paper sheet, an orientation in up-and-down directions is designated at the time of setting in order to perform printing on the coated side.

There are also some types of sheets which cannot be used in the image forming apparatus 201. For example, in a case of a thick paper sheet having an excessively high stiffness, conveyance of the sheet may be stopped due to resistance generated at the time of conveying the sheet along a bent conveyance path. A thin paper sheet having an excessively low stiffness is strongly affected by the sticking force generated between the melted toner and the heating roller 220*b* at the time of passage through the fixing device 201E. Thus, there is a possibility that the sheet cannot be separated from the heating roller 220*b* by the separation plate 221 and is directly wound around the heating roller 220*b* (FIG. 2B). Further, in a case of a synthetic paper sheet which is not made of pulp but of a synthetic resin as a raw material, there is a possibility that the sheet is melted by heating in the fixing device 201E and thereby contaminate the heating roller 220*b*.

Thus, in order to perform image formation appropriately, it is important to identify the type of the sheet S to be used based on the feature amounts of the sheet S before image formation. Therefore, it is required for the media sensor 100 to measure the feature amounts of the sheet S before the sheet S is conveyed to the secondary transfer unit 201D. Operation of the media sensor 100 is controlled by the information processing unit 160, and the processing of the measurement results of each of the ultrasonic wave sensor 120 and the optical sensor 150 is performed by the information processing unit 160. The information processing unit 160 operates under the control of the control unit 400, and transmits the feature amounts of the sheet S obtained from the measurement results of each of the ultrasonic wave sensor 120 and the optical sensor 150 to the control unit 400.

The control unit 400 and the information processing unit 160 start a sheet measurement sequence based on a detection result obtained by the sheet detection sensor 270. The sheet detection sensor 270 detects the conveyed sheet S. For example, the control unit 400 and the information processing unit 160 start the sheet measurement sequence in a case where the sheet detection sensor 270 detects the sheet S. Through starting the sheet measurement sequence, the control unit 400 and the information processing unit 160 cause the ultrasonic wave sensor 120 and the optical sensor 150 to perform measurement operations.

The ultrasonic wave sensor 120 measures the sheet S by using ultrasonic waves, and outputs an output value of a predetermined voltage value as a measurement result. The information processing unit 160 acquires the output value of the ultrasonic wave sensor 120, and derives the transmittance of the sheet S from the output value given when the sheet S is present and the output value given when the sheet S is not present. The information processing unit 160 detects information corresponding to the basis weight from the transmittance of the sheet S. The optical sensor 150 is, for example, a contact image sensor (CIS). The information processing unit 160 stores, in the memory 1601, a luminance value of each pixel as an imaging result obtained by the optical sensor 150. The information processing unit 160 converts the luminance value of each pixel stored in the memory 1601 into information corresponding to surface properties such as a difference integrated value, which is the sum of the differences in luminance values of adjacent pixels, and a brightness.

The information processing unit 160 transmits information corresponding to the basis weight and information corresponding to the surface properties to the control unit 400. The control unit 400 determines the type of the sheet S (paper type, paper type information) based on the acquired information corresponding to the basis weight and information corresponding to the surface properties. The control unit 400 determines one image forming condition (print mode) corresponding to the type of the sheet S from among a plurality of print modes stored in the print mode database 402. The control unit 400 displays information on the determined print mode on the display of the operation unit 502. The print modes are operation modes for controlling image formation under image forming conditions determined in advance (for example, secondary transfer bias value, target fixing temperature of the fixing device 201E, and conveyance speed during fixing). The print modes are named by sheet type, such as "thin paper sheet 1," "thin paper sheet 2," "plain paper sheet 1," "coated paper sheet 1," "coated paper sheet 2," and "coated paper 3." The description given here relates to a method of determining the image forming conditions based on the type of the sheet S, but the method is not limited to this. For example, the control unit 400 determines the type of the sheet S (paper type, paper type information) based on the acquired information corresponding to the surface properties. The control unit 400 may determine one image forming condition (print mode) corresponding to the type of the sheet S and information corresponding to the basis weight from among the plurality of print modes stored in the print mode database 402.

<Configuration of Media Sensor>

Figure 4:
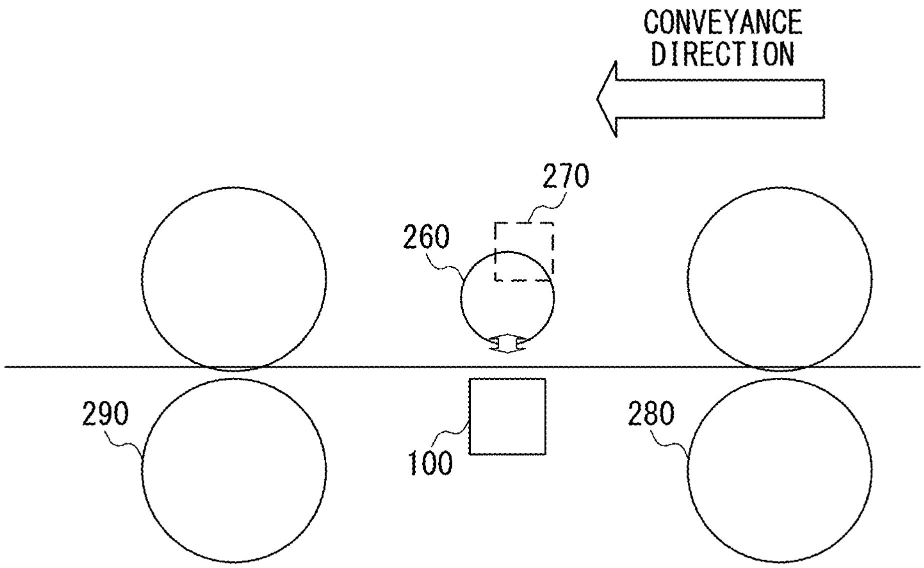
FIG. 4 is an explanatory view of a configuration of a media sensor.
Figure 5:
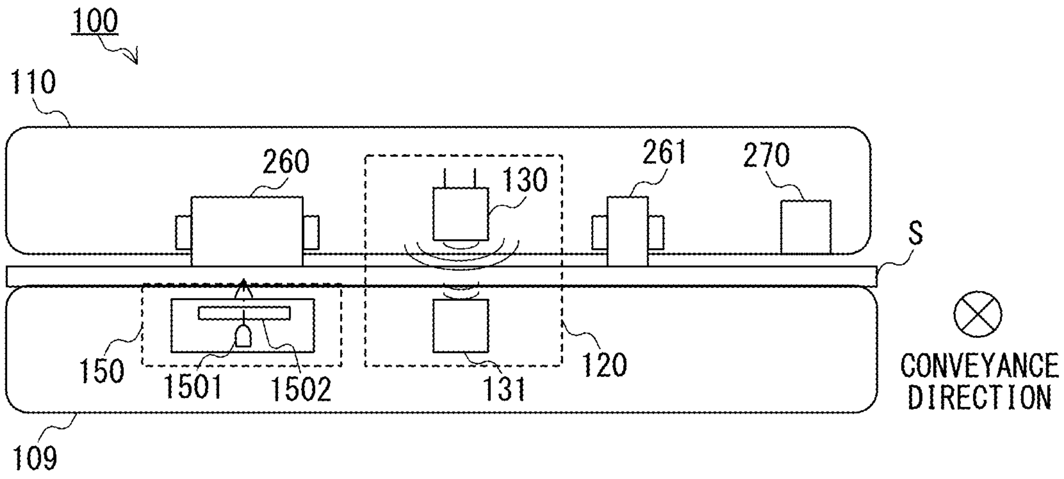
FIG. 5 is an explanatory view of a configuration of a media sensor.

FIG. 4 and FIG. 5 are explanatory views of the configuration of the media sensor 100. FIG. 4 is a view of the media sensor 100 viewed from a direction orthogonal to the conveyance direction of the sheet S. FIG. 5 is a view of the media sensor 100 viewed from the upstream side in the conveyance direction of the sheet S.

As illustrated in FIG. 4, the media sensor 100 is arranged between the conveyance roller pair 280 and the conveyance roller pair 290, and acquires information corresponding to the basis weight of the conveyed sheet S and information corresponding to the surface properties of the conveyed sheet S. The sheet detection sensor 270 is arranged at approximately the same position as that of the media sensor 100 in the conveyance direction of the sheet S. It suffices that the sheet detection sensor 270 be provided on the upstream side of the media sensor 100 in the conveyance direction of the sheet S. A media-sensor-facing roller 260 is arranged at a position facing the media sensor 100 with respect to the conveyance path of the sheet S. The media-sensor-facing roller 260 is configured so as to move in a direction toward the media sensor 100 and in a direction away from the media sensor 100.

As illustrated in FIG. 5, in the media sensor 100, the ultrasonic wave sensor 120 and the optical sensor 150 are arranged at the same position in the conveyance direction of the sheet S, and are arranged side by side in the direction orthogonal to the conveyance direction. The ultrasonic wave sensor 120 includes an ultrasonic wave transmitter 130 and an ultrasonic wave receiver 131. The optical sensor 150 is a CIS including a light source 1501 (for example, an LED) and a line sensor 1502, which are a light emitter and a light receiver, respectively. The optical sensor 150 may be configured by using a CCD image sensor or a CMOS image sensor.

The optical sensor 150 measures the luminance value of received light. For this purpose, it is required that the sheet S be held at an optical focus position of the optical sensor 150. When the ultrasonic wave sensor 120 measures the sheet S, measurement accuracy is improved when there is no influence due to fluttering of the conveyed sheet S. For this reason, it is required that the sheet S be conveyed with a stable posture.

In the at least one embodiment, in order to convey the sheet S with a stable posture, the media-sensor-facing roller 260 and a sheet pressing roller 261 are arranged between the conveyance roller pair 280 and the conveyance roller pair 290. The media-sensor-facing roller 260 and the sheet pressing roller 261 are arranged at the same position in the conveyance direction of the sheet S. The media-sensor-facing roller 260 is arranged facing the optical sensor 150 across the conveyance path, and is configured to press the sheet S toward the optical sensor 150. As a result, variation in the position and the posture of the sheet S is reduced when the media sensor 100 measures the surface of the sheet S. Thus, the media sensor 100 can measure feature amounts of the sheet S, such as the surface properties and the basis weight, under a stable state. The sheet pressing roller 261 is arranged at a position at which the ultrasonic wave sensor

120 is sandwiched between the sheet pressing roller 261 and the media-sensor-facing roller 260.

<Measurement of Basis Weight>

In the ultrasonic wave sensor 120, the ultrasonic wave transmitter 130 and the ultrasonic wave receiver 131 are arranged at opposing positions across the conveyance path. The ultrasonic wave transmitter 130 is arranged on an upper block 110 side of the media sensor 100. The ultrasonic wave receiver 131 is arranged on a lower block 109 side of the media sensor 100. The ultrasonic wave sensor 120 receives ultrasonic waves output from the ultrasonic wave transmitter 130 via the conveyance path of sheet S by the ultrasonic wave receiver 131. The ultrasonic wave receiver 131 outputs information (output value) for determining the basis weight of the sheet S based on the received ultrasonic waves.

The ultrasonic wave transmitter 130 and the ultrasonic wave receiver 131 are each formed of a piezoelectric element (also referred to as "piezo element"), which is an element for mutual conversion between a mechanical displacement and an electric signal, and an electrode terminal. The ultrasonic wave transmitter 130 generates ultrasonic waves through oscillation of the piezoelectric element in response to input of a pulse voltage having a predetermined frequency to the electrode terminal. The generated ultrasonic waves propagate through air. Upon arrival of the ultrasonic waves to the sheet S, the ultrasonic waves cause the sheet S to vibrate. The ultrasonic waves generated in the ultrasonic wave transmitter 130 propagate to the ultrasonic wave receiver 131 via the sheet S. The piezoelectric element of the ultrasonic wave receiver 131 causes the electrode terminal to generate an output voltage corresponding to an amplitude of the received ultrasonic waves. The output voltage has a voltage value corresponding to the basis weight of the sheet S. The output voltage is transmitted as an output value to the information processing unit 160.

The ratio between the output voltage given when the sheet S is not present and the output voltage given when the sheet S is present between the ultrasonic wave transmitter 130 and the ultrasonic wave receiver 131 is the transmittance. The transmittance of the ultrasonic waves changes in accordance with the basis weight (area density) of the sheet S. Thus, the basis weight of the sheet S can be estimated by using a conversion formula or a conversion table between transmittance and basis weight.

<Measurement of Surface Properties>

Figure 6A:
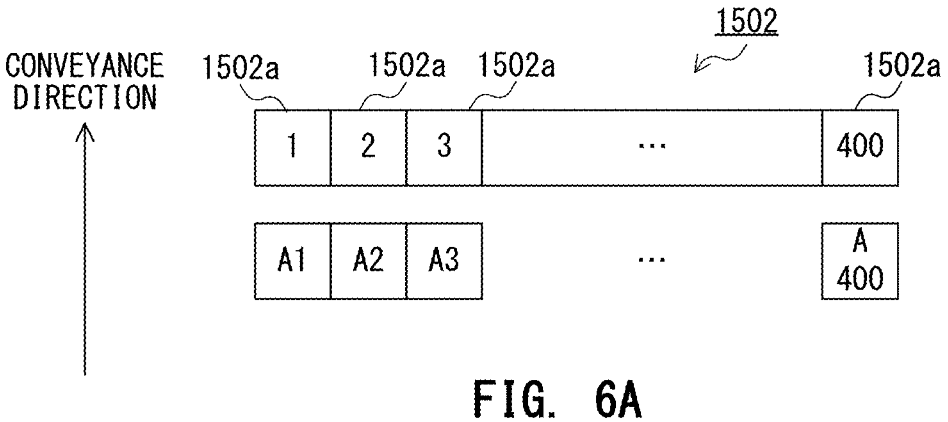
FIG. 6A and FIG. 6B are explanatory diagrams of a reading result obtained by an optical sensor.
Figure 6B:
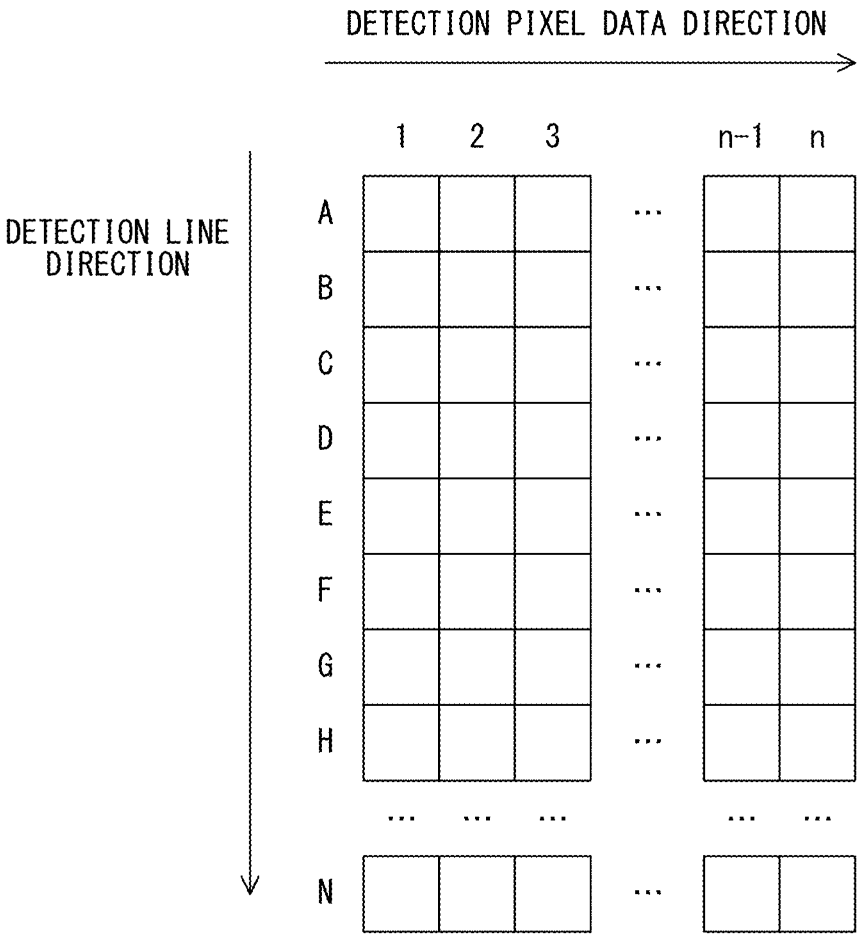

The surface properties of the sheet S are detected by using the optical sensor 150. Light emitted from the light source 1501 illuminates the sheet S at a constant angle by a light guide (not shown). The sheet S reflects the irradiated light. The light reflected by the sheet S forms an image on the line sensor 1502 via a lens (not shown). In this way, the line sensor 1502 can read the light reflected from sheet S as an image. FIG. 6A and FIG. 6B are explanatory diagrams of a reading result obtained by the optical sensor 150.

In FIG. 6A, an example of an image read by the line sensor 1502 is illustrated. The line sensor 1502 includes a plurality of light receiving elements 1502*a*. The plurality of light receiving elements 1502*a* are arranged in a direction orthogonal to the conveyance direction of the sheet S, and thus the line sensor 1502 can read an image corresponding to one line at a time. In the example of FIG. 6A, 400 light receiving elements 1502*a* are arranged, and the line sensor 1502 can thus read an image of 400 pixels (A1 to A400) at a time.

In the at least one embodiment, a plurality of light receiving elements 1502*a* are arranged to achieve a resolution of 300 dpi. The image corresponding to one line which is read at a time by the line sensor 1502 is insufficient as the information amount for determining the surface properties of the sheet S. This is because in an image corresponding to one line, there is a large deviation in the reading results of each reading position. For that reason, the optical sensor 150 performs the reading operation a plurality of times on the conveyed sheet S, and acquires the reading results of the images of a plurality of lines of the sheet S. Through connecting the reading results of a plurality of lines in the conveyance direction of the sheet S, it becomes possible to determine the trend of the surface properties of the sheet S for a predetermined size.

The information processing unit 160 performs digital processing on the image read by the optical sensor 150, and stores the results of the digital processing in the memory 1601 as an output value (luminance value) of each pixel. The information processing unit 160 acquires an integrated difference value, a brightness, and a peak-to-peak (PP) value of the luminance value from the luminance value of each pixel stored in the memory 1601, and stores those pieces of information in the memory 1601.

The integrated difference value is a value obtained by summing the results of integrating the difference in the luminance values of each adjacent pixel of the image read by the line sensor 1502 for the number of lines. The integrated difference value is an index expressing the unevenness of the sheet. In FIG. 6B, when the detection value of each pixel is represented by a pixel position (1 to n) and a detection line (A to N), a difference integrated value Y is expressed based on the following equation (1) by using a difference integrated value "k" for each line. The detection pixel data direction of FIG. 6B is the arrangement direction of the light receiving elements 1502*a* of the line sensor 1502 (the direction of one line of pixels). Further, the detection line direction of FIG. 6B is the conveyance direction of the sheet S.

$$
\begin{aligned}
k1 &= |A2 - A1| + |A3 - A2| \ldots + |An - A(n-1)| \\
k2 &= |B2 - B1| + |B3 - B2| \ldots + |Bn - B(n-1)| \\
&\vdots \\
kN &= |n2 - n1| + |n3 - n2| \ldots + |Nn - N(n-1)| \\
Y &= k1 + k2 + \ldots + kN
\end{aligned}
\tag{1}
$$

The brightness is the sum of the integrated values of the luminance value of each pixel received by the line sensor 1502 for the number of detection lines, and represents the brightness of the surface of the sheet S. A brightness M is expressed by the following equation (2).

$$M = A1 + A2 + \ldots + B1 + B2 + \ldots + G1 + G2 + \ldots + Nn \tag{2}$$

The PP value is a value obtained by summing the difference between the maximum value and the minimum value of the luminance value of one line for the number of detection lines. A transparent film made of a resin such as PET reflects less of the light irradiated from the light source 1501, and is detected as having a low brightness. For a sheet such as an embossed paper sheet having a surface which has been intentionally provided with geometrical unevenness, the unevenness increases the difference in luminance between adjacent pixels, resulting in a large integrated difference value. For a recycled paper sheet, the luminance value is uneven in the fiber orientation, and the pulp fibers become shorter after going through several recycling processes, and thus the surface properties tend to be detected as being rough. Meanwhile, for a coated paper sheet, the coating layer on the surface causes the paper sheet to appear less uneven, and the integrated difference value tends to be smaller. The brightness and the PP value are parameters used to discriminate those sheets.

The control unit 400 acquires the basis weight, the integrated difference value, the brightness, and the PP value as the feature amounts of the sheet S from the information processing unit 160, and refers to the print mode database 402 to determine the print mode. The control unit 400 performs image formation corresponding to the print job by using the image forming conditions based on the determined print mode.

<Position Control of Media-Sensor-Facing Roller>

As described above, the media-sensor-facing roller 260 is configured to move in a direction toward the media sensor 100 (optical sensor 150) and in a direction away from the media sensor 100. That is, the media-sensor-facing roller 260 is movable between a first position separated from the optical sensor 150 and a second position closer to the optical sensor 150 than the first position. The media-sensor-facing roller 260 presses the sheet S toward the optical sensor 150 by moving to the second position. In a case where the media-sensor-facing roller 260 is at the second position, the sheet S is preferably pressed against the optical sensor 150. In this way, the media-sensor-facing roller 260 is a rotating member which functions as a pressing member for pressing the sheet S toward the optical sensor 150. The same applies to the sheet pressing roller 261.

Figure 7:
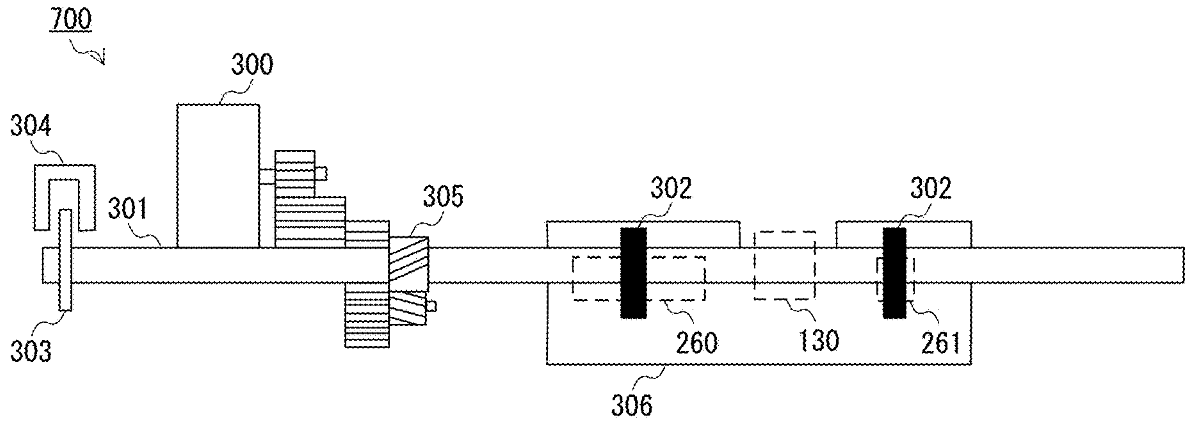
FIG. 7 is a configuration view of a moving mechanism.

FIG. 7 is a configuration view of a moving mechanism which moves the media-sensor-facing roller 260 and the sheet pressing roller 261. FIG. 7 is a view as viewed from above (upper block 110 side of) the media-sensor-facing roller 260 and the sheet pressing roller 261. A moving mechanism 700 includes a motor 300, a rotating shaft 301, a cam 302, a detection plate 303, a rotation detection sensor 304, a gear 305, and a mounting plate 306. The media-sensor-facing roller 260 and the sheet pressing roller 261 are attached to the mounting plate 306. The ultrasonic wave transmitter 130 of the ultrasonic wave sensor 120 is not mounted to the mounting plate 306, but is fixed to the upper block 110 of the media sensor 100.

In a case where the motor 300 is rotationally driven by the control unit 400, the gear 305 rotates. The rotation of the gear 305 causes the rotating shaft 301 to rotate. The rotation of the rotating shaft 301 causes the cam 302 and the detection plate 303 to rotate. The rotation of the cam 302 causes the mounting plate 306 to move up and down. As the mounting plate 306 moves up and down, the media-sensor-facing roller 260 and the sheet pressing roller 261 move. As a result, the media-sensor-facing roller 260 and the sheet pressing roller 261 move synchronously between the first position and the second position.

The positions of the media-sensor-facing roller 260 and the sheet pressing roller 261 are detected by using the rotation detection sensor 304. The rotation detection sensor 304 is a photointerrupter. The rotation detection sensor 304 includes a light emitter and a light receiver arranged facing each other, and is configured so that the light receiver receives light output from the light emitter. The positions of the media-sensor-facing roller 260 and the sheet pressing roller 261 are determined based on whether or not the light output from the light emitter is blocked by the detection plate 303. For example, the rotation detection sensor 304 outputs a detection signal in a first state in a case where the light is not blocked, and outputs a detection signal in a second state different from the first state in a case where the light is blocked.

Figure 8A:
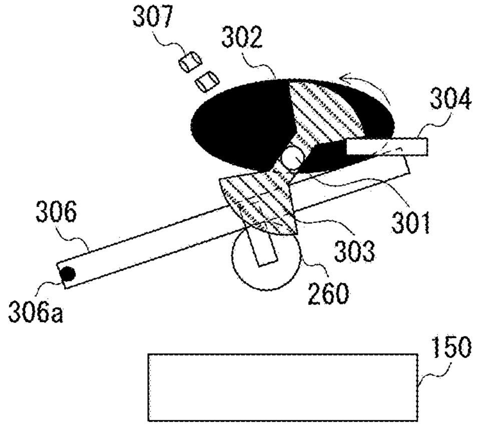
FIG. 8A and FIG. 8B are explanatory views of operation of the moving mechanism.
Figure 8B:
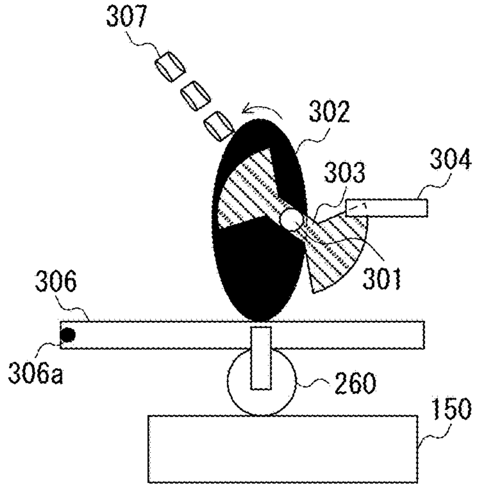

FIG. 8A and FIG. 8B are explanatory views of operation of the moving mechanism 700. Here, description of an operation in which the moving mechanism 700 moves the media-sensor-facing roller 260 is given, but the same operation applies to the sheet pressing roller 261. FIG. 8A and FIG. 8B are views of the moving mechanism 700 as viewed from the detection plate 303 side (direction orthogonal to the conveyance direction of the sheet S). The motor 300 and the gear 305 are not shown. In FIG. 8A, a state is illustrated in which the media-sensor-facing roller 260 has moved to the first position separated from the optical sensor 150. In FIG. 8B, a state is illustrated in which the media-sensor-facing roller 260 has moved to the second position at which the media-sensor-facing roller 260 presses the sheet S against the optical sensor 150.

The mounting plate 306 is configured to rotate around a rotating shaft 306*a*. The mounting plate 306 is connected to a spring 307, and is urged in a direction away from the optical sensor 150 by the spring 307. The rotation angle of the mounting plate 306 changes depending on the rotational position of the cam 302 and the spring 307. As the rotation angle of the mounting plate 306 changes, the position of the media-sensor-facing roller 260 changes between the first position (FIG. 8A) and the second position (FIG. 8B).

The rotational position of the cam 302 can be determined based on whether or not the light from the rotation detection sensor 304 is blocked by the detection plate 303 mounted to the rotating shaft 301. The detection plate 303 has an array shape, as illustrated. In a case where the detection plate 303 rotates together with the rotating shaft 301, the detection signal output from the rotation detection sensor 304 changes. The rotational position of the cam 302 is detected based on the state of the detection signal. For example, the media-sensor-facing roller 260 is at the first position in a case where the detection signal switches from the second state to the first state (FIG. 8A), and is at the second position in a case where the detection signal switches from the first state to the second state (FIG. 8B). Through stopping the rotational driving of the motor 300 at each timing, the media-sensor-facing roller 260 stops at the first position or the second position.

Figure 9:
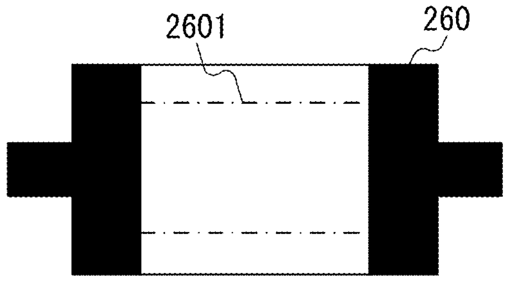
FIG. 9 is a configuration view of a media-sensor-facing roller.
Figure 10A:
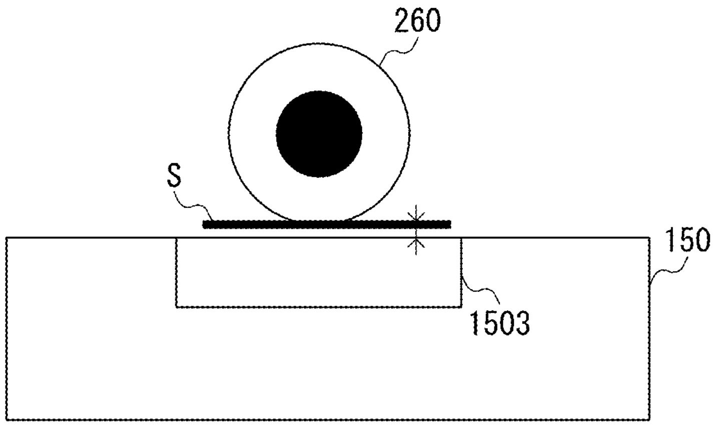
FIG. 10A and FIG. 10B are each an explanatory view of a role of the media-sensor-facing roller.
Figure 10B:
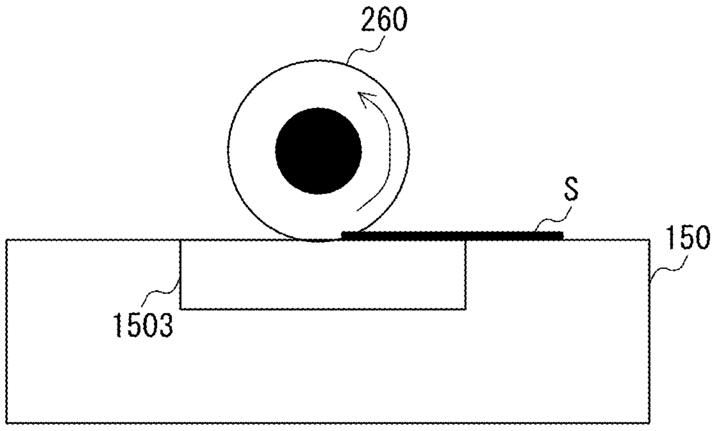

FIG. 9 is a configuration view of the media-sensor-facing roller 260. The media-sensor-facing roller 260 has a dumb-bell shape, and a sponge material 2601 serving as a cleaning member is wrapped around a center portion of the media-sensor-facing roller 260. The media-sensor-facing roller 260 has two roles. FIG. 10A and FIG. 10B are each an explanatory view of a role of the media-sensor-facing roller 260.

The first role of the media-sensor-facing roller 260 is to maintain the distance between the sheet S and a light guide 1503 of the optical sensor 150 during sheet conveyance (FIG. 10A). The media-sensor-facing roller 260 maintains the distance between the sheet S and the light guide 1503 and suppresses fluctuation (flapping) in the position of the sheet S by pressing the sheet S against the light guide 1503 of the optical sensor 150. Thus, the optical sensor 150 can measure the sheet S while the sheet S is stable. The second role of the media-sensor-facing roller 260 (cleaning) is to wipe the surface of the light guide 1503 with the sponge material 2601 to remove paper dust by rotating after the sheet has passed (FIG. 10B). As described above, the light guide 1503 is used to irradiate the sheet S with the light emitted from the light source 1501 at a fixed angle.

Figure 11:
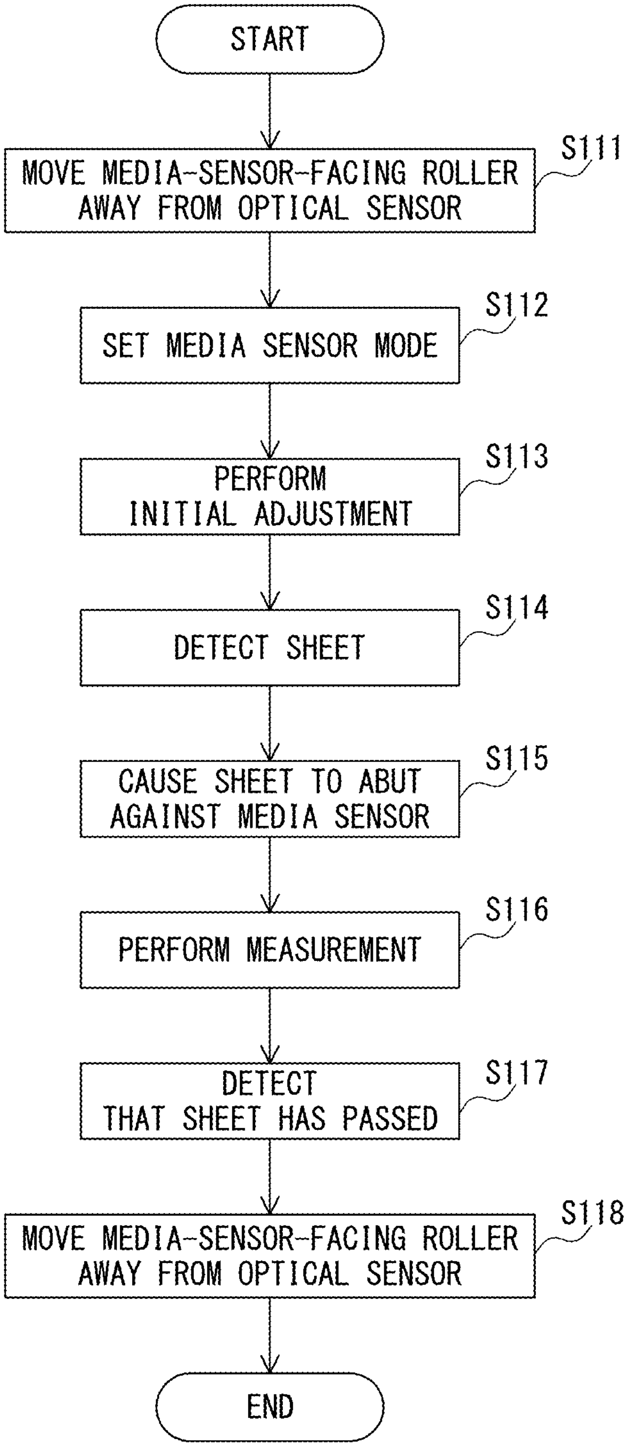
FIG. 11 is a processing flowchart for illustrating movement processing of the media-sensor-facing roller.
Figure 12A:
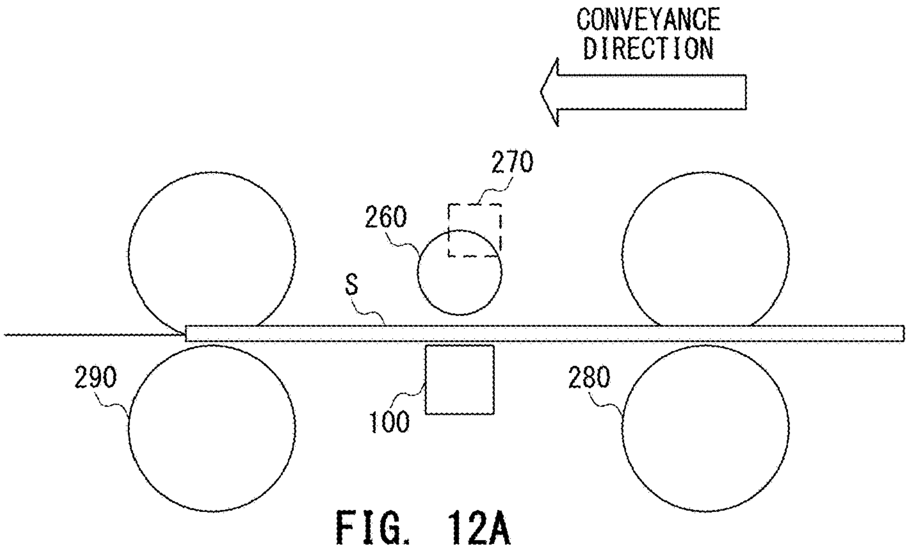
FIG. 12A, FIG. 12B, and FIG. 12C are explanatory views of operation during movement processing of the media-sensor-facing roller.
Figure 12B:
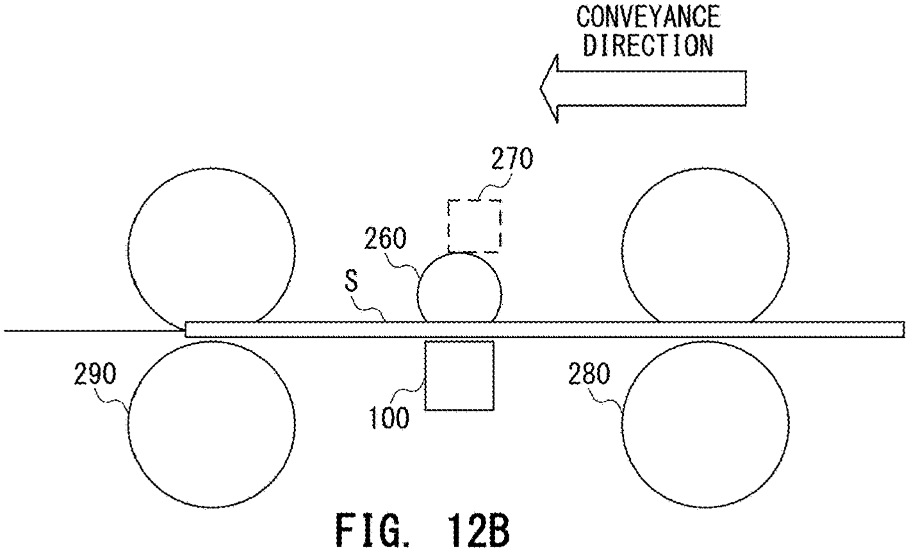
Figure 12C:
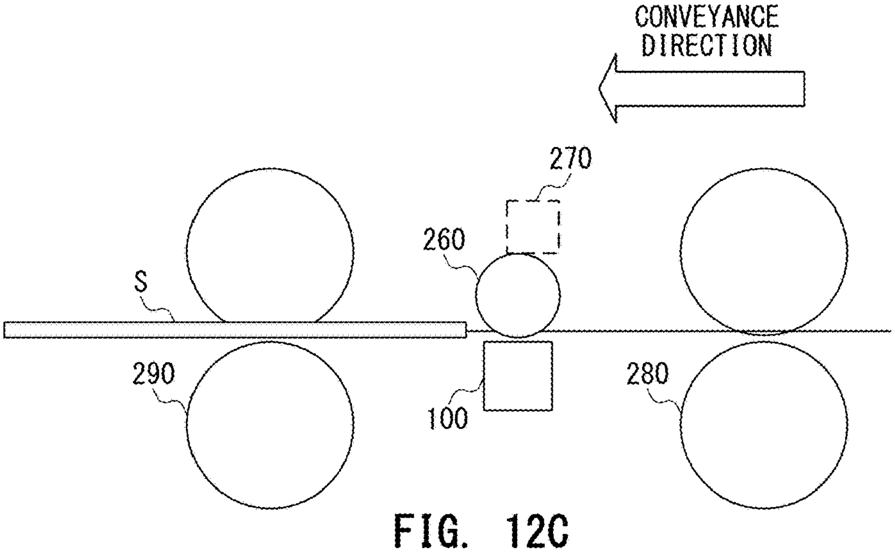

FIG. 11 is a processing flowchart for illustrating movement processing of the media-sensor-facing roller 260. The processing is processing performed in a case where the image forming apparatus 201 is activated or returns from a sleep state to perform a print job. It is noted that in a case where the movement of the media-sensor-facing roller 260 is controlled, the movement of the sheet pressing roller 261 is also controlled in the same way. FIG. 12A to FIG. 12C are explanatory views of operation of the media-sensor-facing roller 260 during the movement processing. Here, description of a case in which the control unit 400 performs the processing is given, but the processing may also be executed by the information processing unit 160 under the control of the control unit 400.

In a case where the image forming apparatus 201 is activated or returns from the sleep state, the control unit 400 rotationally drives the motor 300 to move the media-sensor-facing roller 260 to the first position so as not to hinder the conveyance of the sheet S (Step S111). This causes the media-sensor-facing roller 260 to move away from the optical sensor 150 (FIG. 8A). In an operating mode in which the feature amounts of the sheet S are not measured, the media-sensor-facing roller 260 is maintained at the first position. In a media sensor mode for measuring the feature amounts of the sheet S, the media-sensor-facing roller 260 is movable between the first position and the second position.

In a case where the media sensor mode is set (Step S112), the control unit 400 performs an initial adjustment such as calibration of the optical sensor 150 (Step S113). An instruction for the media sensor mode can be given from the operation unit 502, for example. At the start of the initial adjustment, the control unit 400 rotationally drives the motor 300 to move the media-sensor-facing roller 260 to the second position so as to abut against the optical sensor 150. After the initial adjustment ends, the control unit 400 rotationally drives the motor 300 to move the media-sensor-facing roller 260 to the first position and away from the optical sensor 150.

In the initial adjustment, the media sensor 100 is activated and measurement is performed by the ultrasonic wave sensor 120 under a state in which the sheet is not present. The measurement in a state in which the sheet is not present is processing for detecting a change in output due to a change in the environment, for example, temperature, by performing ultrasonic wave measurement under a state in which the sheet S has not been conveyed. The result of the measurement in a state in which the sheet is not present is used to correct for environmental effects during ultrasonic wave measurement. Further, in the initial adjustment, black measurement of the optical sensor 150 is performed to detect dark current. The light amount of the optical sensor 150 is adjusted based on the dark current. At this time, the media-sensor-facing roller is at the second position, and hence the influence of external light is suppressed.

In a case where the initial adjustment ends, the control unit 400 waits until an instruction to start a print job is acquired. In a case where the control unit 400 acquires the instruction to start a print job, the conveyance unit 600 starts conveyance of the sheet S. In a case where the sheet detection sensor 270 detects the sheet S after the sheet S starts to be conveyed, the control unit 400 stops the conveyance of the sheet S by the conveyance unit 600 (Step S114). In FIG. 12A, a state in which conveyance of the sheet S has stopped is illustrated. The sheet S reaches the measurement position by the media sensor 100, the leading edge is conveyed to the conveyance roller pair 290, and conveyance is stopped. The sheet S is in a state in which a predetermined tension is applied thereto by the conveyance roller pair 280 and the conveyance roller pair 290, and wrinkles on the surface are smoothed out.

The control unit 400, which has stopped the conveyance of the sheet S, rotationally drives the motor 300 to move the media-sensor-facing roller 260 to the second position, and causes the sheet S to abut against the media sensor 100 (Step S115). In this method, during conveyance of the sheet S to the measurement position of the media sensor 100, the media-sensor-facing roller 260 is at the first position, and thus does not hinder the conveyance of the sheet S. Further, during measurement of the sheet S by the media sensor 100, the media-sensor-facing roller 260 presses the sheet S against the media sensor 100 at the second position to stabilize the posture of the sheet S.

The control unit 400, which has caused the media-sensor-facing roller 260 to abut against the media sensor 100, confirms that the media-sensor-facing roller 260 is in abutment against the media sensor 100 based on the detection result of the rotation detection sensor 304. For example, the control unit 400 confirms that the media-sensor-facing roller 260 (sheet S) is in abutment against the media sensor 100 in a case where the detection signal output from the rotation detection sensor 304 has switched from the first state to the second state. After confirming that the media-sensor-facing roller 260 (sheet S) is in abutment against the media sensor 100, the control unit 400 restarts the conveyance of the sheet S by the conveyance unit 600 (FIG. 12B).

At the same time as restarting the conveyance of the sheet S, the control unit 400 performs processing for measuring the feature amounts of the sheet S by the media sensor 100 (Step S116). The media sensor 100 performs ultrasonic wave measurement by using the ultrasonic wave sensor 120, and derives a transmittance based on the measurement result. The control unit 400 derives the basis weight of the sheet S based on the transmittance by using a table or mathematical formula expressing the relationship between the transmittance and the basis weight. The media sensor 100 measures the surface properties of the sheet S by using the optical sensor 150, and derives the integrated difference value and the brightness. The control unit 400 discriminates the type of the sheet S based on the integrated difference value and the brightness. The control unit 400 refers to the print mode database to determine the print mode based on the basis weight and the type of the sheet S, and sets image forming conditions based on the determined print mode. The control unit 400 stops the media sensor 100 in a case where the measurement of the feature amounts of the sheet S ends.

Then, the control unit 400 detects that the trailing edge of the sheet S has passed the measurement position of the media sensor 100 based on the detection result of the sheet detection sensor 270 (Step S117). In FIG. 12C, a state in which the trailing edge of the sheet S has passed the measurement position of the media sensor 100 is illustrated. When the trailing edge of the sheet S passes the measurement position of the media sensor 100, the control unit 400 rotationally drives the motor 300 to move the media-sensor-facing roller 260 to the first position (Step S118). This causes the media-sensor-facing roller 260 to move away from the optical sensor 150. That is, the control unit 400 causes the media-sensor-facing roller 260 to move away from the optical sensor 150 after a predetermined period of time has elapsed since detecting that the trailing edge of the sheet S has passed. As a result, the media-sensor-facing roller 260 can clean the surface of the optical sensor 150 for a predetermined period of time with the sponge material 2601 in abutment against the surface of the optical sensor 150. Other than when the feature amounts of the sheet S are measured, the media-sensor-facing roller 260 is constantly on standby at the first position so as not to hinder the conveyance of the sheet S.

The media-sensor-facing roller 260 may move to the second position and abut against the optical sensor 150 at a time other than when the feature amounts of the sheet S are measured. This is because in a configuration in which cleaning of the surface of the optical sensor 150 by the media-sensor-facing roller 260 is performed only at the timing of measuring the feature amounts of the sheet S, cleaning may not be performed for a long time. When the surface of the optical sensor 150 is not cleaned for a long time, the optical sensor 150 measures the feature amounts of the sheet under a state in which paper dust is attached to the surface, resulting in reduced measurement accuracy. To prevent this situation, the media-sensor-facing roller 260 is moved to the second position at predetermined intervals to clean the surface of the optical sensor 150.

Figure 13:
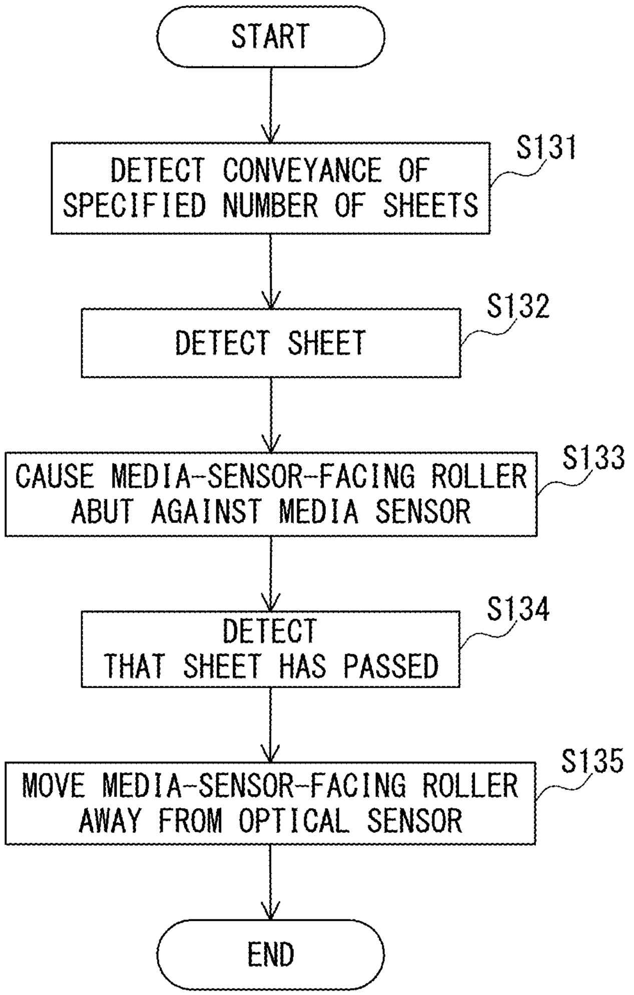
FIG. 13 is a processing flowchart for illustrating processing for cleaning a surface of the optical sensor.

FIG. 13 is a processing flowchart for illustrating processing for cleaning the surface of the optical sensor 150 at predetermined intervals. Here, a case in which cleaning processing is performed every time a predetermined number of sheets S are conveyed (every time images have been formed on a predetermined number of sheets) is given as an example. The predetermined interval is not limited to this, and the cleaning processing may be performed simply when a predetermined period of time has elapsed since the previous cleaning processing ended. Here, a case in which the control unit 400 performs the cleaning processing is described, but the cleaning processing may be executed by the information processing unit 160 under the control of the control unit 400.

The media-sensor-facing roller 260 is on standby at the first position and is separated from the optical sensor 150. The control unit 400 counts the number of passed sheets S, and checks whether the count value has reached a specified number. In a case where the count value reaches the specified number (Step S131), the control unit 400 waits until the sheet detection sensor 270 detects the sheet S. In a case where the sheet detection sensor 270 detects the sheet S (Step S132), the control unit 400 rotationally drives the motor 300 to move the media-sensor-facing roller 260 to the second position and cause the media-sensor-facing roller 260 abut against the media sensor 100 (Step S133).

The control unit 400 maintains the state in which the media-sensor-facing roller 260 is in abutment against the media sensor 100 until after the sheet S passes the measurement position of the media sensor 100, thereby removing paper dust from the optical sensor 150. The control unit 400 detects that the sheet S has passed the measurement position of the media sensor 100 based on the detection result of the sheet detection sensor 270 (Step S134). In a case where the sheet S passes the measurement position of the media sensor 100, the control unit 400 rotationally drives the motor 300 to move the media-sensor-facing roller 260 to the first position (Step S135). As a result, the media-sensor-facing roller 260 moves away from the optical sensor 150.

The above-mentioned configuration of the at least one embodiment, that is, a configuration including the media sensor 100, the controller 200, the conveyance unit 600, the media-sensor-facing roller 260, and the sheet pressing roller 261, becomes a sheet detection device. The sheet detection device can measure the feature amounts of the sheet S by using the media sensor 100, and determine conveyance conditions such as the conveyance speed of the sheet S based on those feature amounts. The media-sensor-facing roller 260 is separated from the media sensor 100 during conveyance of the sheet S to the measurement position of the media sensor 100 so as not to hinder the conveyance of the sheet S. As a result, the occurrence of conveyance failure such as a paper jam is suppressed. During measurement of the sheet S by the media sensor 100, the media-sensor-facing roller 260 moves toward the media sensor 100 and presses the sheet S against the media sensor 100. As a result, flapping of the sheet S during measurement is suppressed, and hence the media sensor 100 can stably perform the measurement in a highly accurate manner.

The image forming apparatus 201 of the at least one embodiment including such a sheet detection device can measure the feature amounts of the sheet S by using the media sensor 100, and determine the image forming conditions for the sheet S based on those feature amounts. The media-sensor-facing roller 260 is separated from the media sensor 100 during conveyance of the sheet S to the measurement position of the media sensor 100 so as not to hinder the conveyance of the sheet S. During measurement of the sheet S by the media sensor 100, the media-sensor-facing roller 260 moves toward the media sensor 100 and presses the sheet S against the media sensor 100. As a result, flapping of the sheet S during measurement is suppressed, and hence the media sensor 100 can stably perform the measurement. As a result, a reduction in the detection accuracy of the sheet can be suppressed, and the occurrence of conveyance failure of the sheet can also be suppressed.

Description of the operation of the media-sensor-facing roller 260 with respect to the optical sensor 150 has been given above. The media-sensor-facing roller 260 is arranged so as to sandwich the ultrasonic wave sensor 120 between the media-sensor-facing roller 260 and the sheet pressing roller 261 (see FIG. 5). With this configuration, in a case where the sheet S reaches the measurement position of the media sensor 100, the media-sensor-facing roller 260 and the sheet pressing roller 261 press the sheet S against the measurement position of the ultrasonic wave sensor 120. The ultrasonic wave sensor 120 transmits ultrasonic waves through the sheet S and measures feature amounts. The state of the sheet S is stabilized by the media-sensor-facing roller 260 and the sheet pressing roller 261, and thus the feature amounts of the sheet S can be accurately measured by the ultrasonic wave sensor 120.

Figure 14:
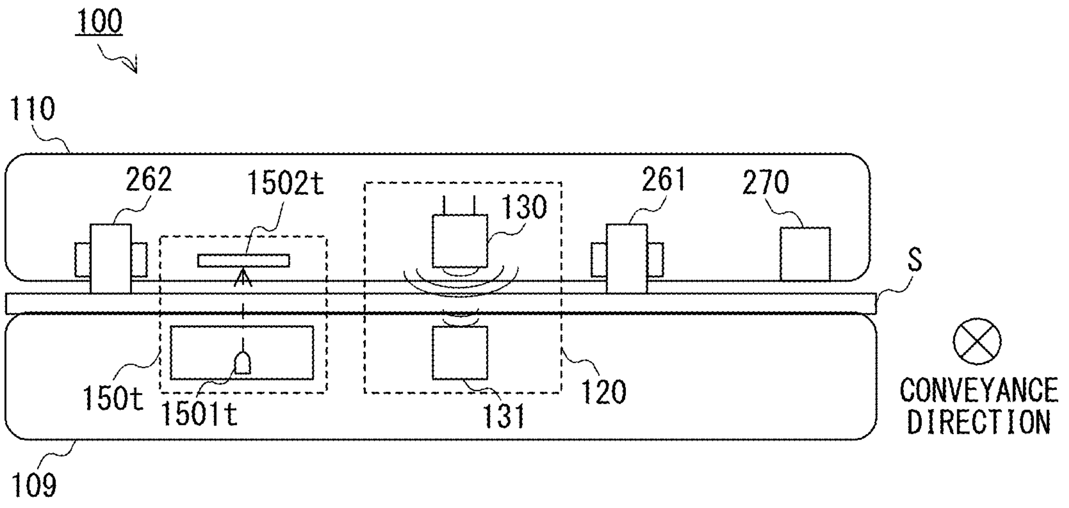
FIG. 14 is an explanatory view of a configuration of a media sensor.

Similarly, the media-sensor-facing roller 260 and the sheet pressing roller 261 are effective in a case where a transmission optical sensor is used. FIG. 14 is an explanatory view of a configuration of a media sensor which uses a transmission optical sensor 150*t*. The transmission optical sensor 150*t* transmits light through the sheet S and measures feature amounts. For that purpose, a light source 1501*t* and a line sensor 1502*t* are arranged facing each other across the conveyance path. Further, the media-sensor-facing roller 260 is not included, and a sheet pressing roller 262 is arranged facing the sheet pressing roller 261 so as to sandwich the optical sensor 150*t*. The state of the sheet S is stabilized by the sheet pressing roller 261 and the sheet pressing roller 262, and thus the feature amounts of the sheet S can be accurately measured by the transmission optical sensor 150*t* as well. In other words, the state of the sheet S is stabilized by, in addition to the media-sensor-facing roller 260 directly pressing the sheet S against the optical sensor 150, the two rollers pressing the sheet S against the optical sensor 150*t* as well. As a result, the sheet S can be stably measured even by the transmission optical sensor 150*t*, a reduction in the detection accuracy of the sheet can be suppressed, and the occurrence of conveyance failure of the sheet can also be suppressed.

The media sensor 100 described above is an example, and is not limited to a configuration including the optical sensor 150 and the ultrasonic wave sensor 120. The media sensor 100 may include another sensor which can measure a feature amount of the sheet S. Further, the media sensor 100 may include any one of the optical sensor 150 and the ultrasonic wave sensor 120.

Further, in the above description, a configuration in which the print mode database 402 is included in the memory 401 of the controller 200 has been described, but the storage location of the print mode database 402 is not limited to this. For example, the print mode database 402 may be stored in the memory 1601 included in the media sensor 100. In this case, the information processing unit 160 determines the type and the basis weight of the sheet S, and the information processing unit 160 also determines the print mode.

In the above description, the configuration of the image forming apparatus 201 has been described, but the present disclosure may be applied to any apparatus including a sheet detection device. For example, such a sheet detection device may be used in an image reading device which reads an image printed on a sheet while conveying the sheet. The image reading device includes an auto document feeder (ADF). Through incorporating the sheet detection device in the ADF, it becomes possible to stably read an image and convey the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-149047, filed Sep. 14, 2023, which is hereby incorporated by reference herein in its entirety.

What is claimed is:

1. A sheet detection device comprising:

a measurement unit for measuring a feature amount of a sheet conveyed by a conveyance unit;

a pressing member movable between a first position separated from the measurement unit and a second position closer to the measurement unit than the first position; and a moving unit configured to move the pressing member, wherein the pressing member is arranged by the moving unit at the first position in a case where the sheet has not been conveyed by the conveyance unit to a measurement position of the measurement unit, wherein the moving unit is configured to move the pressing member to the second position from the first position in a case where the sheet has been conveyed by the conveyance unit to the measurement position of the measurement unit, and wherein the measurement unit is configured to measure the feature amount of the sheet under a state in which the pressing member is arranged at the second position, wherein the pressing member is two rotating members, wherein the two rotating members are arranged so that the measurement position is positioned between the two rotating members in a direction orthogonal to a conveyance direction of the sheet, and wherein the pressing member includes a cleaning member, and is configured to clean the measurement unit by causing the cleaning member to abut against the measurement unit at the second position.

2. The sheet detection device according to claim 1, wherein the moving unit is configured to move the pressing member from the second position to the first position after a leading edge in a conveyance direction of the sheet passes the measurement position by the conveyance unit.

3. The sheet detection device according to claim 1, wherein, in a case where the sheet has been conveyed by the conveyance unit to the measurement position of the measurement unit, the pressing member which has been moved from the first position to the second position by the moving unit is arranged at the second position until the sheet passes the measurement position.

4. The sheet detection device according to claim 3, wherein, under a state in which the pressing member is arranged at the second position, the pressing member is configured to abut against the sheet until a trailing edge in a conveyance direction of the sheet passes the measurement position, and abut against the measurement unit after the trailing edge of the sheet passes the measurement position.

5. The sheet detection device according to claim 1, further comprising a sheet detection sensor configured to detect the sheet conveyed to the measurement position, wherein the moving unit is configured to move the pressing member from the first position to the second position in a case where the sheet detection sensor detects the sheet.

6. The sheet detection device according to claim 5, wherein the sheet detection sensor is arranged on an upstream side of the measurement unit in a conveyance direction of the sheet.

7. The sheet detection device according to claim 1, wherein the moving unit is configured to move the pressing member to the second position in a case where an initial adjustment of the measurement unit is executed.

8. The sheet detection device according to claim 1, wherein the moving unit is configured to move the pressing member from the first position to the second position in a case where an initial adjustment of the measurement unit is executed under a state in which the sheet has not been conveyed to the measurement position of the measurement unit, wherein the measurement unit is configured to execute the initial adjustment under a state in which the pressing member is arranged at the second position, and wherein the moving unit is configured to move the pressing member from the second position to the first position after the initial adjustment is executed.

9. The sheet detection device according to claim 8, wherein, after the initial adjustment is executed, the pressing member is arranged at the first position in a case where the sheet has not been conveyed to the measurement position of the measurement unit by the conveyance unit, wherein the moving unit is configured to move the pressing member from the first position to the second position in a case where the sheet has been conveyed to the measurement position of the measurement unit by the conveyance unit, and wherein the measurement unit is configured to measure the feature amount of the sheet under a state in which the pressing member is arranged at the second position.

10. The sheet detection device according to claim 8, wherein, in a case where the initial adjustment is executed, the pressing member is configured to move to the second position to abut against the measurement unit.

11. The sheet detection device according to claim 1, wherein the moving unit is configured to move the pressing member from the first position to the second position at predetermined intervals.

12. An image forming apparatus comprising:
the sheet detection device of claim 1; and
an image forming unit configured to form an image by using an image forming condition based on a feature amount of a sheet measured by the measurement unit.

13. A sheet detection device comprising:
a measurement unit for measuring a feature amount of a sheet conveyed by a conveyance unit;
a pressing member movable between a first position separated from the measurement unit and a second position closer to the measurement unit than the first position; and
a moving unit configured to move the pressing member,
wherein the moving unit is configured to move the pressing member from the first position to the second position in a case where an initial adjustment of the measurement unit is executed under a state in which a sheet has not been conveyed to a measurement position of the measurement unit,
wherein the measurement unit is configured to execute the initial adjustment under a state in which the pressing member is arranged at the second position,
wherein the moving unit is configured to move the pressing member from the second position to the first position after the initial adjustment is executed,
wherein, after the initial adjustment is executed, the pressing member is arranged at the first position in a case where the sheet has not been conveyed to the measurement position of the measurement unit by the conveyance unit,
wherein the moving unit is configured to move the pressing member from the first position to the second position in a case where the sheet has been conveyed to the measurement position of the measurement unit by the conveyance unit, and
wherein the measurement unit is configured to measure the feature amount of the sheet under a state in which the pressing member is arranged at the second position.

14. The sheet detection device according to claim 13, wherein, in a case where the initial adjustment is executed, the pressing member is configured to move to the second position to abut against the measurement unit.

15. The sheet detection device according to claim 13, wherein the pressing member is a rotating member.

16. The sheet detection device according to claim 13,
wherein the pressing member is two rotating members, and
wherein the two rotating members are arranged so that the measurement position is positioned between the two rotating members in a direction orthogonal to a conveyance direction of the sheet.

17. The sheet detection device according to claim 16, wherein the pressing member includes a cleaning member, and is configured to clean the measurement unit by causing the cleaning member to abut against the measurement unit at the second position.

18. The sheet detection device according to claim 13, wherein the moving unit is configured to move the pressing member from the first position to the second position at predetermined intervals.

19. An image forming apparatus comprising:
the sheet detection device of claim 13; and
an image forming unit configured to form an image by using an image forming condition based on a feature amount of a sheet measured by the measurement unit.

* * * * *